United States Patent [19]

Keller et al.

[11] 4,198,461

[45] Apr. 15, 1980

[54] POLYMERIC FIBER MASSES, FIBERS THEREFROM, AND PROCESSES FOR PRODUCING THE SAME

[75] Inventors: Leon B. Keller, Palos Verdes Estates; Robert K. Jenkins, Huntington Beach, both of Calif.

[73] Assignee: Hughes Aircraft Company, Culver City, Calif.

[21] Appl. No.: 905,702

[22] Filed: May 15, 1978

Related U.S. Application Data

[63] Continuation of Ser. No. 616,747, Dec. 25, 1975, abandoned, which is a continuation-in-part of Ser. No. 481,412, Jun. 20, 1974, abandoned.

[51] Int. Cl.² .................. B28B 1/08; B06B 3/00; B32B 5/26; B32B 5/28
[52] U.S. Cl. .................. 428/288; 264/9; 264/23; 264/69; 427/384; 428/301; 428/302; 428/361; 428/364; 428/500; 428/516; 428/521; 428/523; 428/910
[58] Field of Search .................. 428/297, 299, 301, 302, 428/361, 359, 515, 516, 521, 288, 364, 523, 500, 910; 264/9, 23, 69; 427/384, 386

[56] References Cited

U.S. PATENT DOCUMENTS

| | | | |
|---|---|---|---|
| 3,317,335 | 5/1967 | Marrinan et al. | 428/301 X |
| 3,770,562 | 11/1973 | Newman | 428/287 |
| 3,796,778 | 3/1974 | Gallagher | 264/49 |
| 3,811,923 | 5/1974 | Hammer et al. | 428/904 X |
| 3,914,497 | 10/1975 | Kanehira et al. | 428/288 |
| 3,914,501 | 10/1975 | Miller et al. | 428/288 X |
| 3,917,448 | 11/1975 | Wood | 428/299 |
| 3,949,126 | 4/1976 | Crawford | 428/113 |
| 4,039,711 | 8/1977 | Newman | 428/288 X |
| 4,048,429 | 9/1977 | Berg et al. | 264/69 X |

*Primary Examiner*—Harold Ansher
*Attorney, Agent, or Firm*—W. H. MacAllister; B. T. Hogan

[57] ABSTRACT

We have prepared a new class of polymeric fibers and masses which are produced by precipitation from solutions of the polymer. The fibers and fiber masses have novel and useful characteristics. A fiber mass of this invention is a coherent, three-dimensional network of interconnected crystalline polymeric fibers and fiber bundles randomly arrayed in all directions. The fibers are smaller in diameter than can be consistently produced by conventional fiber drawing and spinning techniques.

The novel fiber masses are produced from solutions of fiber-forming linear organic polymers having regularly repeated chain structures. The polymers are precipitated from these solutions by simultaneously cooling and agitating the polymer solution at vibrations in the sonic frequency range. The fiber masses may then be removed from the solvent or, in the case of a polymerizable solvent, a composite may be formed.

16 Claims, 4 Drawing Figures

POLYMERIC FIBER MASSES, FIBERS THEREFROM, AND PROCESSES FOR PRODUCING THE SAME

This is a continuation application of Ser. No. 616,747, filed Dec. 25, 1975, now abandoned, which in turn was a continuation-in-part of application Ser. No. 481,412, filed June 20, 1974, now abandoned.

BACKGROUND OF THE INVENTION

1. Field of the Invention

This invention is directed to the formation of novel polymeric fiber masses, the fibers therefrom and processes for producing the same. It also involves composites of said polymeric fiber masses in a solid polymeric matrix.

2. Description of Prior Art

In the past, polymeric fibers have frequently been made by drawing or extruding a viscous solution of the polymeric forming substance through a small orifice. The fibers are then stretched to orient them and increase their strength. Also, fibers are produced by extrusion of molten polymers. The resultant fibers are rarely less than 0.0001 inch (approx. 30,000 A) in diameter.

Fibers have also been formed by stirring a very dilute solution of the fiber-forming material. This procedure results in the formation of linear fibers attached to the stirrer (Pennings, A. J., et al., Polymere, 99 (1969). These fibers are non-uniformly distributed around the stirrer and are spirally arranged. The formation of similar fibers from stirred solutions has also been reported by A. Keller, (Physics Today, May 1970, page 42.) In addition, a crystalline material having a shish kebab structure has been formed by irradiating a dilute solution of polyethylene in p-xylene with ultrasonics at 0.1 to 0.4 mW/cm from 85 to 190 kilo Hz at a temperature between 82° C. to 88° C. The concentration of polyethylene in the solvent ranged from 0.05 to 0.5% by weight. (Blackadder and Schlenitz, Nature 200, 778 (1963)).

Recently, Gallacher in U.S. Pat. No. 3,796,778 has produced fibrous mats or web type structures which on superficial inspection seem similar to the fiber masses of this invention. Gallacher states that the structure of his fiber mat is a "web of oriented, interconnected, directional fiberlike strands, membranes, branched ribbons and fibrils".

The fibrous mats of Gallacher are produced from a heterogeneous, two phase mixture of two incompatible polymers. A mixture of two polymers is milled together while in a heated semi-liquid state. The fibrous mass and web-like interconnected structure is produced by mechanical drawing and shearing in the molten state of one of the polymers within the mass by the action of the two roll mill. The fibrous mat is then separated from the other matrix polymer by dissolving the matrix away with a selective solvent.

Also, in U.S. Pat. No. 3,778,294, Krauch and Sanner produced polymers having a fibrous polymeric structure for the reinforcement of non-woven fabrics. Their method is restricted to the formation of fibrous poromeric material from ethylenically unsaturated monomers with at least two polymerizable double bonds or mixtures containing at least 0.01% by weight of these monomers and ethylenically unsaturated monomers. Apparently, a quasi-fibrous structure is caused to occur by curing these monomers within the interstices among the crystals of a partially frozen or solidified solvent. Curing is caused to occur by irradiation with high energy light or ionizing radiation. The material is then thawed and the non-woven fabric reinforced polymeric material is separated from the solvent. Although Krauch and Sanner do not describe the morphology of their polymeric material precisely, they do indicate that their invention is limited to sheet-like or planar forms because of the necessity of efficient cooling and complete penetration of the irradiation. Also, they describe their material as a fibrous polymeric material from which it is deduced that porous or sponge-like characteristic exist in combination with some fibrous characteristics. The products are described as soft, leatherlike, and velvety.

SUMMARY OF THE INVENTION

We have found that when a solution of fiber-forming materials is agitated by the influence of vibrations in the sonic frequency range while the solution is cooled, a coherent, interconnected mass of fibers is produced. The mass is three-dimensionally randomly arrayed and exhibits isotropic characteristics which are not present in conventional fiber masses. It is also coherent, and therefore it does not easily lose its integrity.

Composites having novel fiber masses of this invention distributed throughout also exhibit improved isotropic characteristics.

DESCRIPTION OF THE INVENTION

We have discovered a new process for growing novel polymeric fiber masses.

When a solution of a fiber-forming polymeric material is agitated by vibrations in the sonic frequency range as it cools, the polymeric fibers are precipitated from solution, producing a dense fiber mass throughout the volume of the solution. The fiber masses of this invention exhibit an unusual structure and arrangement which differentiates them from other man-made fibers. They are a three-dimensional network comprised of very small diameter fibers and fiber bundles randomly arrayed in all directions. The fibers and fiber bundles have a substantially circular cross-section. The fibers are in a coherent mass because of interconnection due to a combination of bifurcation of the fiber bundles, side growth of polymer fibers upon primary fiber bundles, and entanglement of the fibers with each other. This interconnected, three dimensional array gives rise to isotropic structural, thermal, electrical and optical characteristics to the fiber masses. The fiber masses consist of extremely small diameter fibers and fiber bundles with a very large surface area as evidenced by the fact that they will absorb and retain a volume of liquid essentially equal to the apparent volume of the fiber mass.

Figure 2:
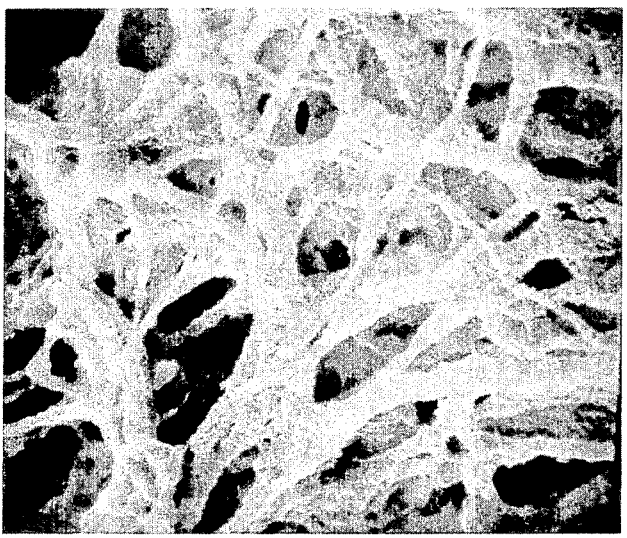
FIG. 2 is an electron microscope photograph of fibers at 4500X made from isotactic polypropylene by the method of this invention.
Figure 3:
FIG. 3 is an electron microscope photograph of individual polypropylene fiber bundles at 10,000X.

The fibers and fiber bundles of our invention are interconnected and bifurcated to produce a coherent mass but differ from the products of Gallacher in that the fibers and fiber bundles are substantially circular in cross section and the individual fibers are substantially smaller in diameter by a factor of approximately twenty than the fibrils of Gallacher. The unique fibrous structure of the products of our invention is shown in FIG. 2 which is an electron microscope photograph of typical products of our invention. In FIG. 3, which is an electron microscope photograph of large polypropylene fiber and fibrils extending from it, the diameter of some of the fibrils is estimated to be of the order of 100A°.

Figure 4:
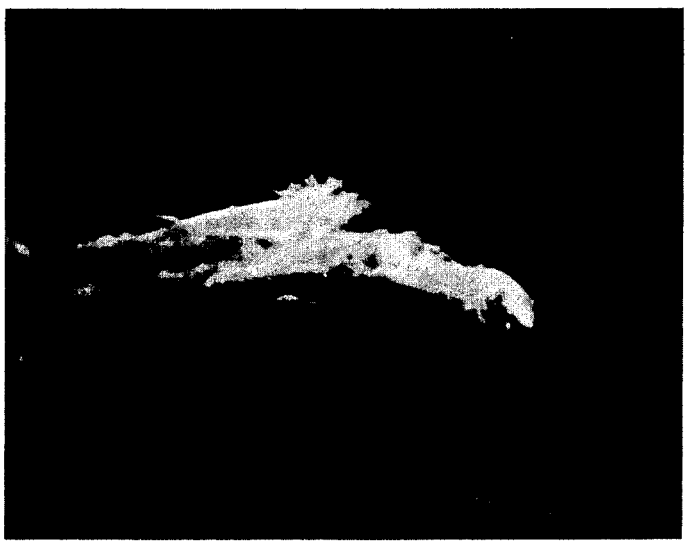
FIG. 4 is a photomicrograph at 45X of the broken end of a polypropylene fiber bundle after tensile strength testing.

We have performed tensile strengths upon some of the distinct fiber bundles made by the method of our invention. FIG. 4 illustrates the appearance of a fiber bundle of isotactic polypropylene after breaking in tension. We have measured achieved tensile strengths of 9,000 psi based upon the apparent gross cross-sectional area of the fiber bundle. We estimated however that the true tensile strength of the individual fibers comprising the fiber bundle, which can clearly be seen extending from the broken ends of the bundle, is of the order of 40,000 to 50,000 psi.

The extreme fineness and uniform fibrous shape of the fibers of our invention as compared to those of Gallacher are a direct result of the completely different methods of manufacture involved. The fibers of our invention are produced from homogeneous solutions by precipitation. They are of extremely small diameter since they are produced by a process of crystalline growth which starts with a single polymer molecule and grows in the fibrous form under the influence of vibration and further polymer precipitation.

In general, we have found that a variable frequency range of vibration is more effective than a single frequency and that the optimum frequencies are those which produce maximum agitation of the solution. Frequencies from about 80 to about 2,000 Hz are preferred, and those from about 80 to 800 Hz are very practical. Solutions subjected to vibrations having a frequency range from about 80 to 800 Hz have generated fiber masses of extremely low densities, for example, $3.6 \times 10^{-2}$ g/cm; and individual fibers and fiber bundles whose diameters range from $1 \times 10^2$ A° to about 0.03 mm.

Fiber-forming materials which are useful in this invention are polymeric materials which have been used in the past to produce polymeric fibers. In general, we prefer those materials which are linear, organic polymers having a regularly repeated chain structure and a degree of crystallinity as determined by X ray diffraction. Highly crystalline polymers, such as isotactic polypropylene and nylon, are particularly useful in this invention. We have successfully produced fiber masses consisting essentially of polyethylene oxide, nylon, and polyalkenes; typical polyalkenes are polyethylene, isotactic polypropylene, isotactic poly (4-methylpentene-1), isotactic poly(butene-1), polystyrene, and mixtures thereof.

Solvents useful in the process of this invention may be polymerizable or nonpolymerizable. Typical useful polymerizable solvents are styrene, acrylic acid, divinylbenzene, methylmethacrylate and allylglycidyl ether. Typical useful nonpolymerizable solvents are toluene and xylene. Obviously, the choice of solvent will depend upon various factors such as the nature of the solute and the final product to be obtained from the process. For economical reasons, a nonpolymerizable solvent will be generally preferred when one wants to isolate the fiber mass per se from the end product.

It is usually advantageous to include an inhibitor with a polymerizable solvent to prevent or retard the polymerization of the solvent. For example, hydroquinone is effective as an inhibitor of styrene for this purpose.

In general, it will be advisable and on occasions even necessary to heat the solvent in order to dissolve an adequate amount of the fiber-forming material therein. The solution is then allowed to cool slowly, usually to room temperature while it is simultaneously subjected to vibrations. We prefer to scan the overall range of vibrations in the sonic frequency range, pausing at those frequencies which cause maximum agitation to the solution. When no further visible fiber formation is observed at a given frequency, we continue the scanning until a second frequency is found to produce significant agitation. Given the same conditions, it will not be necessary to observe the formation of the fibers; it will be possible to produce them by repetition of these conditions.

The solution will preferably contain from about 2% to about 20% by weight of the fiber-forming material. The upper limit may be dictated by the limit of solubility of the fiber-former. When the solution is treated in accordance with the present invention, the precipitated fiber mass is substantially uniformly dispersed through the whole solvent area, and in many cases the solvent will be completely absorbed by the fiber mass.

If the fiber mass is the desired product, the solvent may be removed by routine methods, at least somewhat dictated by the nature of the solvent. For instance, a volatile solvent may be removed by simple evaporation. A relatively nonvolatile solvent can be washed out with a volatile liquid, the traces of which can then be evaporated.

Our fiber masses have a variety of practical uses.

They may be impregnated with a curable polymeric resin to form fiber reinforced composites. In fact, the fiber mass may be formed in a polymerizable solvent and because the fiber mass provides isotropic reinforcement, it imparts improved isotropic strength properties to the composite. As a result, it is not likely to develop microscopic flaws which can significantly interfere with the electrical and physical properties of the material. In addition the masses may be broken up to provide individual fibers or fiber bundles which can also be used to form papers, cloth, felts, mats, nonwoven fabrics, cordage and the like.

The following are some of the advantages of this invention:

(1) Rapid fiber growth in solution.
(2) Fiber growth can be ascertained visually.
(3) Very high strength fibers of very small diameter are produced.
(4) The fiber masses are extremely absorbent, and
(5) Fiber growth is achieved through the solution conforming exactly to the container and any object immersed therein.

Figure 1:
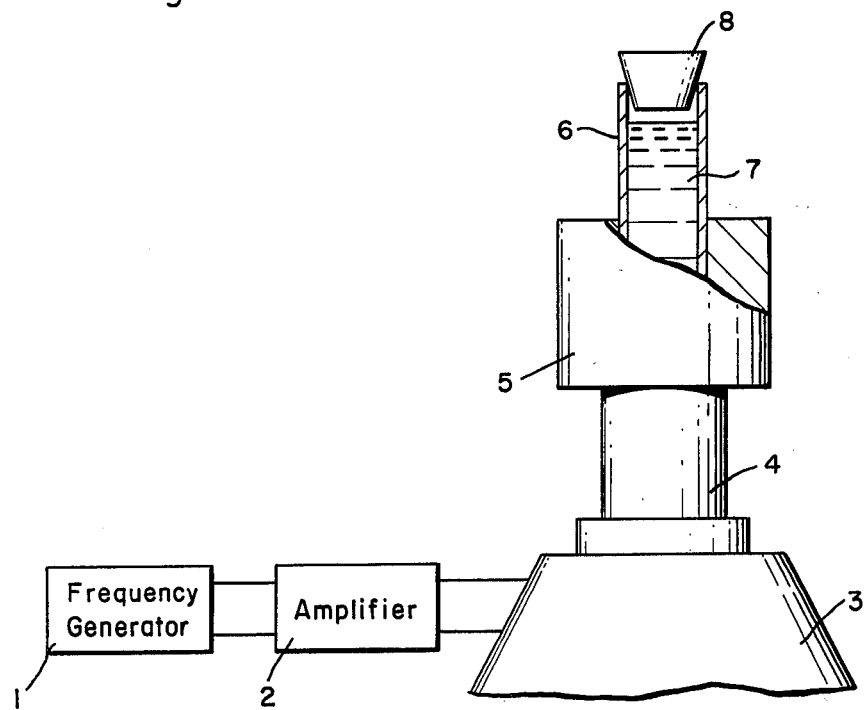
FIG. 1 is a schematic representation of a device used to impart vibrations at sonic frequencies to a fiber-forming solution.

With reference to FIG. 1, which illustrates one apparatus for carrying out our invention, a frequency generator 1 is connected to an amplifier 2 used to vary the frequency of a shakerhead 3 which drives a shaft 4 connected to holder 5 which is capable of retaining container 6 in which a solution 7 of the present invention is held by means of stopper 8.

The circular cross section of the fibers is clearly visible at the magnification of 4500X. The fiber bundle appears to be made up of many small fibrils in a parallel array. The fiber bundle shows evidence of narrowing in diameter or necking down under tension and the broken ends of the multitude of fibrils which constitute the fiber bundle are clearly visible.

Having described the invention in general the following examples are provided by way of illustration.

EXAMPLE I 20 ml of a 5 percent solution of isotactic polypropylene in styrene inhibited with hydroquinone was heated to 120° C. to dissolve the polypropylene. Then the test tube with solution was placed into the holder of the vibrator system, and the solution was subjected to vibrations from about 800 to 90 Hz during which time resonance frequencies were visually located.

The sample was held at several resonance frequencies of notable agitation until such time as the entire sample had become a fibrous mass. During this period, the system was allowed to cool toward room temperature. The mass was removed from the test tube by inverting and tapping the tube. The fibrous mat, due to its enormous surface area, held the solvent styrene within its interstices, thus requiring solvent extraction (acetone) for complete removal.

EXAMPLE II 20 ml of a 7 percent solution of polypropylene in styrene containing 0.02 percent benzoquinone was prepared in a test tube at 130° C. and placed into the shaker head fixture. A fiber mat was formed by scanning a frequency range from 700 to 90 Hz as the sample slowly cooled. Upon completion of the fiber mass formation, the sample was placed into an oven and held at 70° C. to effect thermal polymerization of the bound styrene. The sample was inspected occasionally to determine the state of polymerization. Due to the presence of the inhibitor, benzoquinone, the rate of polymerization was slow, however, a fiber reinforced plastic was formed consisting of isotactic polypropylene fibers in polystyrene.

EXAMPLE III 0.25 g polyethylene and 0.25 g isotactic polypropylene were dissolved in 10 ml styrene inhibited with 0.1 g benzoquinone at 125° C. This solution was subjected to low frequency vibrations as it cooled, thus causing the formation of a fiber mass. Essentially all of the polymers were formed into the fiber mat.

EXAMPLE IV 0.7 g nylon-6 and 0.7 g of isotactic polypropylene were added to 10 ml of styrene with 0.1 g of benzoquinone as inhibitor. The mixture was held at about 130° C. as 10 ml acrylic acid was added. The solution was cooled during sonic vibrations with the production of a hard fiber mass.

EXAMPLE V

Isotactic polybutene-1 was dissolved in monomer styrene to form 10 ml of a 5% solution. The mixture was heated and held at 100° C. for about 2 hours, during which time a true solution formed. To the polymer solution was added about 5 ml of monomer methylmethacrylate so that the volume ratio of styrene to methylmethacrylate was 2:1. The temperature of the solution was slowly lowered while being agitated by sonic vibration, thus causing the formation of fibers at about 60°–50° C. The free monomer solvent was subsequently polymerized by adding 2% of 2, 4-dichlorobenzoyl peroxide and 1% benzyldimethylamine as accelerator. The mixture was cured at 40° C. for 3 days to form a very tough composite.

EXAMPLE VI 0.5 gm polypropylene dissolved in a mixture of 10 ml styrene and 5 ml allylglycidyl ether inhibited with 0.1 gm hydroquinone at 132°–133° C. formed a very good fibrous mass within an hour upon cooling under sonic vibrations. The frequency range was scanned from 70 to 2000 Hz with resonance frequencies at 1000, 500, 300 and 200 Hz.

EXAMPLE VII

Brittle fibrous mats were produced from sonic vibration of a mixture of Nylon 6 and polypropylene in styrene and acrylic acid inhibited with benzoquinone in the following concentrations at 135° C.:
Nylon-6=0.7 g
polypropylene=0.7 g
styrene=10 ml
acrylic acid=10 ml
benzoquinone=0.1 g

EXAMPLE VIII

A solution was prepared of isotactic polybutene-1 in 20 ml of styrene and 10 ml of methylmethacrylate by heating at 100° C. About 0.021 g of benzoquinone was employed to inhibit the monomers from thermal polymerization. The solution was transferred to the shaker head and slowly cooled as the frequency of 80–1000 Hz was scanned. A fibrous plug was formed.

Other solvent mixture combinations may be used in conjunction with benzoquinone and hydroquinone inhibitors to form either fibrous masses or curable composites. It is necessary to scan the vibration frequencies to obtain the optimum level for mixing in each case because of the differences in the viscosities.

EXAMPLE IX

A solution of 1 g polypropylene in 10 ml toluene upon cooling from 125° C. under sonic vibrations yielded a very large mass of fibers which exhibited a randomly arrayed three-dimensional interconnecting structure. Toluene can be removed from the fiber mass by evaporation or by solvent extraction.

EXAMPLE X

Concentrations of 2.5, 5, 7.5, 10, 15, and 20% polypropylene were dissolved in xylene at 132° C. Vibration frequencies ranging from 80–1000 Hz were scanned during the cooling of the mixture to produce fibrous mats.

EXAMPLE XI

Plugs of polypropylene fibers were formed by sonic vibrations from a 5% polypropylene by weight solution in xylene. The residue of xylene was removed from the fiber plugs by solvent extractions with acetone. Following acetone extraction, the fiber plugs were dried 60 minutes at 40° C. The fiber plugs were then immersed in a resin formulation in a beaker and subjected to moderate vacuum until all bubbling ceased. The resin formulation consisted of 74.5% diglycidyl ether of bis-phenol A, 5.9% vinyl cyclohexene dioxide and 19.6% menthane diamine by weight. Each impregnated specimen was placed in a 2 cm diameter test tube and covered with excess resin. Following one additional vacuum cycle, the resin-impregnated fiber plug was cured for 8 hours at 65° C. and 8 hours at 115° C. While there was some evidence of shrinkage, the resulting composites were of excellent appearance.

EXAMPLE XII

Similar fiber masses have been impregnated with catalyzed monomers such as styrene, acrylic acid and methylmethacrylate which, when cured thermally, yield novel composites.

EXAMPLE XIII

One gram of isotactic polypropylene and 0.002 g of benzoquinone were added to 10 ml of styrene monomer. This mixture in a test tube was slowly heated in an oil bath to a temperature of 130° C. causing the dissolution of the polymer. The container was removed from the oil bath and placed into a polymethyl methacrylate fixture, mounted on a small shaker head whose frequency and amplitude were controlled by an audio oscillator and power amplifier. The sample was cooled, during which time various vibrational frequency modes were scanned by use of the oscillator. The effects of vibration during cooling of the system created enough internal hydrodynamic shear so that a fibrous polymer plug with bound styrene formed. Examination of this polymer plug revealed that it consisted primarily of interconnected fibers.

EXAMPLE XIV 0.5 g isotactic polypropylene was dissolved in 10 ml styrene containing 0.05 g of hydroquinone. The mixture was heated to 90° C. and held there for 10-15 min. The temperature was increased in 10° C. increments holding for 5 min. at each new temperature until 120° C. was reached. The container was then removed from the heat source and placed on the dynamic shaker exposing it to a frequency of 450 Hz. The sample was held in resonance, and fibers appeared in a colloidal blue media.

The styrene impregnated fibrous plug was placed into an oven held at 70° C. to polymerize the monomer styrene into a plastic matrix of polystyrene.

Having fully described our invention, its application and its utility, the scope of our claims may now be understood.

What is claimed is:

1. A three-dimensional fibrous mass consisting essentially of crystalline, branched polymeric fibers and fiber bundles, said fiber bundles being formed of many fibrils in substantially parallel array, said fibers and fiber bundles being branched and being structurally integral each with the other at their points of branching so that the fibers and fiber bundles are randomly arranged in all directions to define a coherent mass having isotropic properties.

2. A fibrous mass of claim 1 wherein said fibers and fiber bundles are formed of a linear polyalkene.

3. A fibrous mass as defined in claim 1 wherein the fibers and fiber bundles are formed of a polymer selected from the group consisting of polyethylene, isotactic polypropylene, polyethylene oxide, isotactic poly 4-methylpentene-1, isotactic poly(butene-1), nylon, polystyrene and mixtures thereof.

4. A fibrous mass of claim 1 wherein said fibers and fiber bundles are formed of a polyethylene.

5. A fibrous mass of claim 1 wherein said fibers and fiber bundles are formed of an isotactic polypropylene.

6. A fibrous mass of claim 1 wherein said fibers and fiber bundles are formed of an isotactic poly(butene-1).

7. A fibrous mass of claim 1 wherein said fibers and fiber bundles are formed of an isotactic poly-4-methylpentene-1.

8. A fibrous mass of claim 1 wherein said fibers and fiber bundles are formed of a nylon.

9. A three-dimensional fibrous mass consisting essentially of crystalline, branched polymeric fibers and fiber bundles having substantially circular cross sections, said fiber bundles being formed of many fibrils in substantially parallel array, said fibers and fiber bundles being branched and being structurally integral each with the other at their points of branching so that the fibers and fiber bundles are randomly arranged in all directions to define a coherent mass having isotropic properties.

10. A three-dimensional fibrous mass consisting essentially of crystalline, branched polymeric fibers and fiber bundles having substantially circular cross sections, said fiber bundles being formed of many fibrils in substantially parallel array, said fibers and fiber bundles having been precipitated from solution to define a branched network and being structurally integral each with the other at their points of branching so that the fibers and fiber bundles are randomly arranged in all directions to define a coherent mass having isotropic structural, thermal, electrical and optical properties.

11. A composite material comprising (1) a polymeric material in the form of a continuous phase having substantially uniformly dispersed therein (2) a fibrous mass consisting essentially of crystalline, branched polymeric fibers and fiber bundles, said fiber bundles being formed of many fibrils in substantially parallel array, said fibers and fiber bundles being branched and being structurally integral each with the other at their points of branching so that the fibers and fiber bundles are randomly arranged in all directions to define a coherent mass having isotropic properties.

12. A composite material of claim 11 wherein said material is formed of a linear polyalkene.

13. A composite material of claim 11 wherein said material is formed of a polyethylene.

14. A composite material of claim 11 wherein said material is formed of an isotactic polypropylene.

15. A composite material as defined in claim 11 wherein the material is formed of a polymer selected from the group consisting of polyethylene, isotactic polypropylene, polyethylene oxide, isotactic poly 4-methylpentene-1, isotactic poly(butene-1), nylon, polystyrene and mixtures thereof.

16. A composite material comprising (1) a polymeric material in the form of a continuous phase having substantially uniformly dispersed therein (2) a fibrous mass consisting essentially of crystalline, branched polymeric fibers and fiber bundles having substantially circular cross sections, said fiber bundles being formed of many fibrils in substantially parallel array, said fibers and fiber bundles having been precipitated from solution to define a branched network and being structurally integral each with the other at their points of branching so that the fibers and fiber bundles are randomly arranged in all directions to define a coherent mass having isotropic properties.

* * * * *